US006654661B2

(12) United States Patent
Schmitz

(10) Patent No.: US 6,654,661 B2
(45) Date of Patent: Nov. 25, 2003

(54) METHOD AND APPARATUS FOR AUTOMATICALLY POSITIONING A PRESS MACHINE SLIDE

(75) Inventor: David Schmitz, Coldwater, OH (US)

(73) Assignee: The Minster Machine Company, Minster, OH (US)

(*) Notice: Subject to any disclaimer, the term of this patent is extended or adjusted under 35 U.S.C. 154(b) by 0 days.

(21) Appl. No.: 10/151,545

(22) Filed: May 20, 2002

(65) Prior Publication Data

US 2002/0170444 A1 Nov. 21, 2002

Related U.S. Application Data

(63) Continuation-in-part of application No. 09/515,553, filed on Feb. 29, 2000.

(51) Int. Cl.[7] .......... G06F 19/00

(52) U.S. Cl. .......... 700/206; 425/144

(58) Field of Search .......... 100/257; 700/206, 700/117, 170, 56–64; 702/33, 36, 150

(56) References Cited

U.S. PATENT DOCUMENTS 4,177,517 A * 12/1979 Mette et al. .......... 700/206
4,939,665 A * 7/1990 Gold et al. .......... 700/206
5,140,834 A * 8/1992 Kashiwagi et al. .......... 72/15.2
5,224,053 A * 6/1993 Cook .......... 700/206
5,444,613 A * 8/1995 Tani et al. .......... 700/56
5,470,218 A * 11/1995 Hillman et al. .......... 425/144

* cited by examiner

*Primary Examiner*—Leo Picard
*Assistant Examiner*—W. Russell Swindell
(74) *Attorney, Agent, or Firm*—Randal J. Knuth

(57) ABSTRACT

A control system enables a press operator to selectively position the slide at a specific resting location corresponding to an absolute dimension of the slide travel path, such as an angular measure relative to the top dead center position of the press machine crankshaft. A programmable limit switch module manages the operation of a brake-clutch combination by commanding a clutch control circuit to actuate disengagement of the clutch at the proper moment so that the slide will subsequently come to rest at the selected resting location. The module includes a programmable limit switch connected to a press speed resolver and a dedicated on-board processor configured to receive the speed data. The processor collects the speed data using a polling operation having very low scan time.

42 Claims, 3 Drawing Sheets

METHOD AND APPARATUS FOR AUTOMATICALLY POSITIONING A PRESS MACHINE SLIDE

CROSS-REFERENCE TO RELATED APPLICATIONS

This application is a continuation-in-part of U.S. patent application Ser. No. 09/515,553 to David Schmitz filed Feb. 29, 2000 and entitled AUTO-POSITIONING INCHING CONTROL, which is assigned to the same assignee as the present application and is incorporated herein by reference thereto.

BACKGROUND OF THE INVENTION

1. Field of the Invention

The present invention relates to a mechanical press, and, more particularly, to an auto-positioning control system for maneuvering a press machine slide into a resting state at any selectable location along the slide path.

2. Description of the Related Art

Mechanical presses of the type performing stamping and drawing operations employ a conventional construction that includes a movable slide guided by a frame structure having a crown and a bed. The frame structure supports the slide in a manner enabling reciprocating movement of the slide towards and away from the bed. These press machines are widely used for a variety of workpiece operations and employ a large selection of die sets. Accordingly, the press machines vary considerably in size and available tonnage depending upon its intended use.

A flywheel and clutch assembly are utilized to transmit mechanical energy from a main drive motor to the press crankshaft. The flywheel assembly serves as the primary source of stored mechanical energy and rotary driving power. Standard press configurations have the flywheel located between the main drive motor and clutch, with the flywheel being mounted on either the driveshaft, crankshaft or press frame by use of a quill.

The main drive motor replenishes the flywheel with rotational energy as it becomes depleted during the course of press working strokes as the clutch engages the flywheel and establishes a driving connection between the flywheel and the crankshaft. In particular, when the crankshaft and flywheel are engaged in driving relationship, the flywheel energy is converted into mechanical work to power the press components, namely, the reciprocating slide. During engagement of the clutch, the flywheel drops in speed as the press driven parts are brought up to running speed.

Maneuvering the slide into a particular stroke position along the slide path is useful during tooling setup as well as stock material feed setup. For example, the slide can be positioned along the slide path by manually rotating an otherwise stationary flywheel with the clutch engaged or by pulsing the clutch while the flywheel is rotating to intermittently engage the flywheel.

Manual rotation of the flywheel can be accomplished by inserting a lever such as a long metal bar into bores within the flywheel. Raising or lowering the bar will then manually rotate the flywheel and cause the slide to correspondingly move up or down.

However, this method of flywheel adjustment is time consuming and requires that flywheel motion be stopped, making this process inapplicable to operational situations that require slide repositioning during a press running mode. Additionally, this manner of slide adjustment is prone to imprecision and positional inaccuracies since it is based upon visual indication of slide position as perceived by the press operator. Generally, most forms of manual adjustment produce sub-optimum results due to a lack of precise reproducibility arising from human errors inherent in any task predominated by manual manipulation.

The intermittent engagement or pulsing of the clutch is likewise an inferior approach to slide adjustment since the frequent engagement and disengagement of the clutch causes excessive wear to the clutch components. Additionally, this method of slide adjustment produces inconsistent slide displacement values per pulse since the distance the slide moves per pulse is dependent upon, for example, counter balance settings and slide position. Typically, there is not provided any compensation scheme to account for the variability introduced by such factors as counter-balance settings and slide position.

Since pulsing a clutch in equal time intervals typically will not produce correspondingly equivalent units of slide movement, this method of achieving a stop position for the slide of a mechanical press is inaccurate, as it is based upon visual indications of slide position as perceived by a press operator and unequal increments of slide movement.

What is needed in the art is a method and apparatus for allowing a press operator to choose an absolute dimensional value at which the mechanical press may be stopped, namely, an exact specific slide location at which the slide will come to rest.

What is further needed in the art is a system for locating the slide of a mechanical press at a specific absolute resting position that does not require manual intervention vis-à-vis the press components, and which does not excessively wear the clutch and brake components of the press.

What is further needed in the art is a means for repositioning the slide that minimizes the time interval between the submission of the repositioning request and placement of the slide into its fully resting state at the selected slide position.

What is further needed in the art is a compensation strategy useful in repositioning the slide that comprehensively accounts for all of the temporal factors that contribute to lessening the reactivity and responsivity of the repositioning system, such as processing delay, scan time delay, and communication delay.

SUMMARY OF THE INVENTION

According to one form of the present invention, there is provided a control system to enable a press operator to selectively position the slide at a specific resting location corresponding to an absolute dimension of the slide travel path. In one form, the resting location for the slide may represent a specific angular value, such as a degree measure (0–359°) relative to the top dead center (TDC) position of the press machine crankshaft.

The slide positioning process may be facilitated by a programmable limit switch module that suitably manages the operation of a brake-clutch combination by commanding a clutch control circuit to actuate disengagement of the clutch at the proper moment so that the slide will come to rest at the selected resting location.

According to another form of the invention, the slide control system is implemented with a programmable limit switch module that is suitably configured to optimally minimize the operational delays that typically exist in applications involving the coordinated interaction among various discrete components connected over a distributed platform. For example, the programmable limit switch module is provided in a form that aims to reduce the scan time related to the retrieval of press speed information by integrating all of the functionality of the slide positioning process within a single, self-contained, stand-alone modular unit.

In one form, the programmable limit switch module includes a programmable limit switch device connected to a press speed resolver and a dedicated processor connected directly to the programmable limit switch device and/or resolver. The processor may be a special purpose computer or computational device such as a programmable logic controller (PLC) or a general purpose computer or computational device that has been configured with the appropriate processing software.

In one form, the processor is configured with an algorithm that computes the precise clutch drop-out condition based upon various input variables, such as press slide speed. For this purpose, the algorithm performs a function that addresses speed-related compensation to account for variable advancement of the clutch drop-out position based upon slide speed.

The programmable limit switch module is suitably configured, for example, to minimize the scan time related to retrieval of press speed information by the processor.

The invention, in one form thereof, is directed to a system for use with a press machine environment having a slide and an apparatus to selectably control movement of said slide. The system includes, in combination, an input device and a unit operatively associated with the apparatus. The input device is configured to enable a user to selectively indicate a resting location for the slide corresponding to an absolute slide position. The unit is configured to control operation of the apparatus using a resting location indication operatively received from the input device.

In one form, the indication of resting location for the slide is representative of a specific angular value. For example, the angular value may correspond to a degree measure (0–359°) relative to the top dead center (TDC) position of the press machine crankshaft.

In one form, the input device includes a graphical user interface having a touchscreen or a manual data entry device.

In one form, the unit includes a processor such as a microprocessor or programmable logic controller.

In one form, the processor is configured to operatively generate at least one apparatus control signal as a function of press machine type, counter-balance setting and/or position, slide position, slide speed, die characteristics, delay-related factors, computational time and/or processing time, scan time, or any combination thereof.

In one form, the apparatus includes a brake-clutch combination and a clutch control circuit. In this embodiment, the apparatus control signals generated by the processor include a signal specifying clutch dropout and/or brake activation.

In another form, the unit includes a programmable limit switch module including a programmable limit switch device and a processor. The programmable limit switch device is operatively connected to a press machine clutch control circuit. The processor is operatively connected to the programmable limit switch device. The processor is configured to determine a clutch dropout value based at least in part upon the resting location indication operatively received from the input device and input data comprising a measure of slide speed.

In one form, the system further includes a resolver to provide a measure of slide speed and/or slide position. A non-bus connection is disposed between the processor and the resolver and/or programmable limit switch device.

The invention, in another form thereof, is directed to a system for use with a press machine environment having a slide and an apparatus to selectably control movement of the slide. The system includes, in combination, a first means to provide an indication of a resting location for the slide corresponding to an absolute slide position; and a second means to selectably position the slide in accordance with a resting location indication operatively provided by the first means.

In one form, the indication of resting location for the slide is representative of a specific angular value. For example, the angular value may correspond to a degree measure (0–359°) relative to the top dead center (TDC) position of the press machine crankshaft.

The first means, in alternate forms thereof, may include a user-interactive selector or a graphical user interface.

The second means, in one form thereof, includes an apparatus to control movement of the slide, and a processor configured to control operation of the apparatus using a resting location indication operatively provided by the first means.

The processor, in one form thereof, is configured to operatively generate at least one apparatus control signal as a function of press machine type, counter-balance setting and/or position, slide position, slide speed, die characteristics, delay-related factors, computational time and/or processing time, scan time, or any combination thereof.

The apparatus, in one form thereof, includes a brake-clutch combination and a clutch control circuit. In this embodiment, the apparatus control signals generated by the processor include a signal specifying clutch dropout and/or brake activation.

The second means, in another form thereof, includes a programmable limit switch connected to a press machine clutch control circuit, and a processor connected to the programmable limit switch. The processor is configured to determine a clutch dropout value based at least in part upon the resting location indication operatively provided by the first means and input data comprising a measure of slide speed.

In one form, the system further includes a resolver to provide a measure of slide speed and/or slide position. A non-bus connection is disposed between the processor and the resolver and/or programmable limit switch.

The invention, in another form thereof, is directed to an apparatus in association with a press machine environment having a slide and a slide controller configured to control movement of the slide. The apparatus includes, in combination, a programmable limit switch operatively connected to the slide controller, and a processor operatively connected to the programmable limit switch. The processor is configured to define a slide stoppage event based at least in part upon an indication of a resting location for the slide corresponding to an absolute slide position.

In one form, the indication of resting location for the slide is representative of a specific angular value. For example, the angular value may correspond to a degree measure (0–359°) relative to the top dead center (TDC) position of the press machine crankshaft.

In one form, the apparatus further includes an input device enabling a user to selectably generate the resting location indication. Furthermore, the slide controller may include a press machine clutch control circuit.

The processor, in one form thereof, is configured to determine a clutch dropout condition based at least in part upon press machine type, counter-balance setting and/or position, slide position, slide speed, die characteristics, delay-related factors, computational time and/or processing time, scan time, or any combination thereof.

The apparatus further includes a resolver to provide a measure of slide speed and/or slide position. A non-bus connection is disposed between the processor and the resolver and/or programmable limit switch.

The invention, in another form thereof, is directed to a method in association with a press machine environment having a slide. According to the method, there is provided an indication of a resting location for the slide corresponding to an absolute slide position. Movement of the slide is then controlled in accordance with the resting location indication.

In one form, the indication of resting location for the slide is representative of a specific angular value. For example, the angular value may correspond to a degree measure (0–359°) relative to the top dead center (TDC) position of the press machine crankshaft.

The process for controlling the slide movement involves determining a clutch dropout condition for a press machine clutch using the resting location indication, and then controlling operation of the press machine clutch in accordance with the clutch dropout condition.

In one form, the determination of clutch dropout condition is based at least in part upon press machine type, counter-balance setting and/or position, slide position, slide speed, die characteristics, delay-related factors, computational time and/or processing time, scan time, or any combination thereof.

The invention, in another form thereof, is directed to a method in association with a press machine environment having a slide. According to the method, there is provided an indication of a resting location for the slide corresponding to an absolute slide position. The slide is then caused to come to rest substantially at the absolute slide position.

In one form, the indication of resting location for the slide is representative of a specific angular value. For example, the angular value may correspond to a degree measure (0–359°) relative to the top dead center (TDC) position of the press machine crankshaft.

In one form, the process for causing the slide to come to rest involves selectively disengaging a press machine clutch and/or selectively engaging a press machine brake.

In another form, the process for causing the slide to come to rest involves determining a clutch dropout condition for a press machine clutch using the resting location indication. Operation of the press machine clutch is then controlled in accordance with the clutch dropout condition.

In one form, the determination of clutch dropout condition is based at least in part upon press machine type, counter-balance setting and/or position, slide position, slide speed, die characteristics, delay-related factors, computational time and/or processing time, scan time, or any combination thereof.

One advantage of the present invention is that the process of repositioning the slide is fully automated and thereby enables exact reproducibility of the repositioning process.

Another advantage of the present invention is that the control system for repositioning the slide is configured so as to optimally minimize and/or eliminate the various sources of delay inherent in physical computer environments, thereby providing a near-instantaneous response between user request of slide repositioning and actual implementation of the stopping force (i.e., clutch disengagement and/or brake activation).

Another advantage of the invention is that the slide can be repositioned to an exact absolute dimension pertaining to its travel path, such as a specific angular value corresponding to a degree measure (0–359°) relative to the top dead center (TDC) position of the press machine crankshaft.

A further advantage of the invention is that the precise positioning of the slide removes the need for any secondary or follow-up slide adjustments, such as would be accomplished by inching control mechanisms or other systems providing fine slide movement.

A further advantage of the invention is that the user is provided with enhanced control of the press operation since the user can select an exact resting location for the slide, thereby expanding the number of opportunities available to the press operator for performing position-dependent tasks such as die adjustment/replacement, part maintenance, tool adjustment/replacement, and other changes to the press environment.

A further advantage of the invention is that all of the data processing and command, control and communication tasks required for executing the slide positioning process are fully integrated within the programmable limit switch module, thereby optimally minimizing the scan time attending the polling of the press speed sensor.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
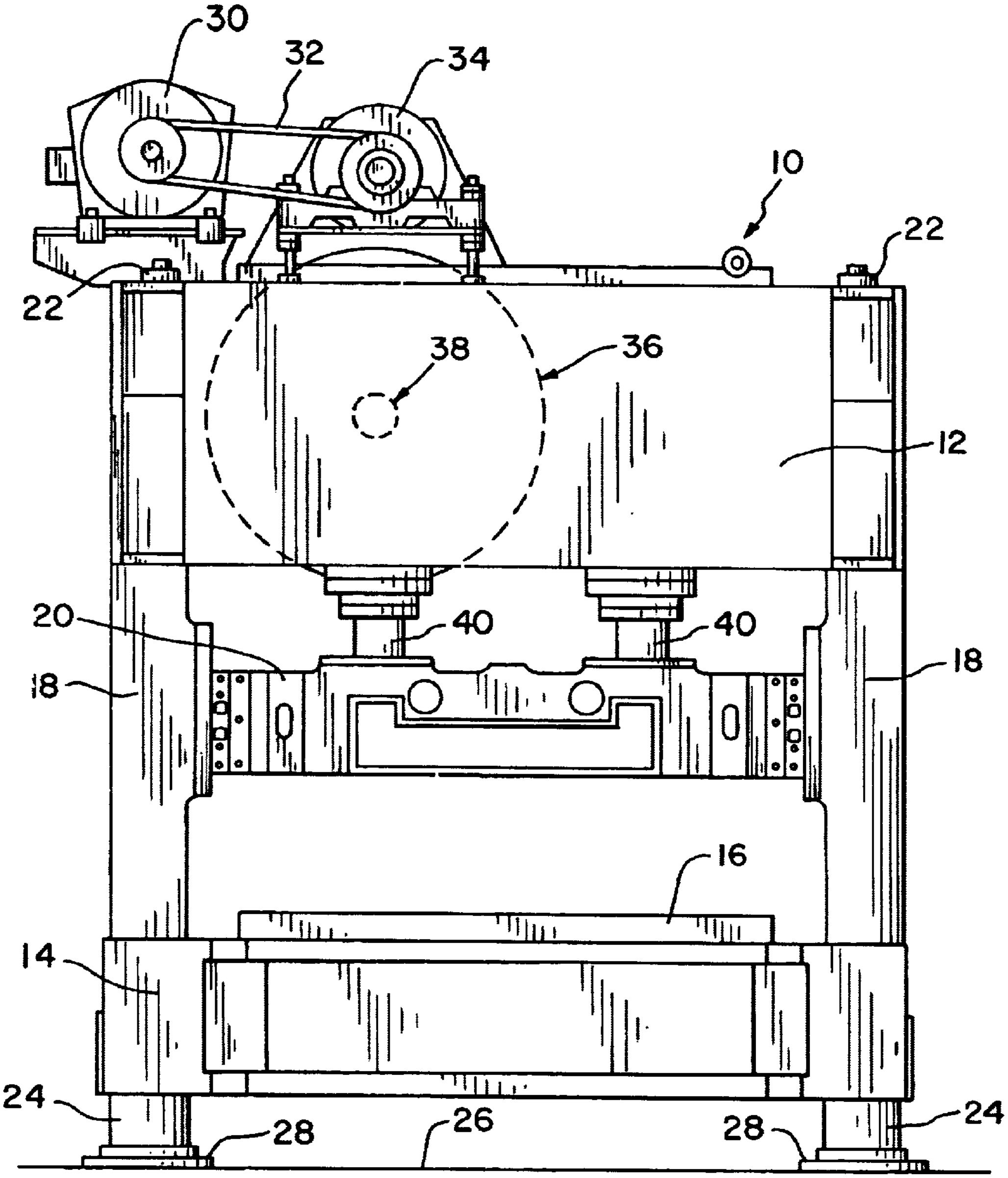
FIG. 1 is a front elevational view of a mechanical press incorporating one form of the present invention.

By way of background, reference is first made to FIG. 1 to illustrate one form of a press machine for use with the invention. More particularly, mechanical press 10 comprises a crown 12 and bed 14 having a bolster assembly 16 connected thereto with uprights 18 connecting crown 12 with bed 14. Uprights 18 are connected to or integral with the underside of crown 12 and the upper side of bed 14. A slide 20 is positioned between uprights 18 for reciprocating movement toward and away from bed 14. A set of tie rods (not shown) extend through crown 12, uprights 18, and bed 14, and are attached at each end with tie rod nuts 22. Leg members 24 are formed as an extension of bed 14 and are generally mounted on shop floor 26 by means of shock absorbing pads 28.

A press drive motor 30 is attached by means of belt 32 to auxiliary flywheel 34. Auxiliary flywheel 34 is connected by means of a belt (not shown) to the main flywheel depicted generally at 36. The flywheel/clutch/brake assembly is depicted generally at 36 with the main flywheel being operative to transmit rotational motion to crankshaft 38. Crankshaft 38 is connected to slide 20 by way of connecting rods 40. Crankshaft 38 is operatively connected to connecting rods 40 so that the rotary motion of crankshaft 38 is translated into reciprocating movement of slide 20.

This description of press machine 10 is provided for illustrative purposes only and should not be construed in limitation of the present invention, as it should be apparent that the invention may be practiced in connection with any type of press machine environment. Moreover, the invention may be practiced in conjunction with any type of press application or press operational or non-operational state.

For example, the slide control process to effectuate a resting position for the slide may be used during a pre-operational procedure to fix the position of the slide so as to perform a tool or die set-up operation. For this purpose, the stationary press could be run for a short cycle to facilitate the repositioning. Alternately, the slide control process may be accomplished dynamically in real-time during a press running operation.

Generally, in accordance with one form of the invention, a method and system are provided to permit a user or press operator to selectively control the slide movement in a manner enabling the user to direct controlled stoppage of the slide so that the slide comes to rest at a specified requested identifiable location. This selectable slide placement preferably occurs automatically in response to a user input representing the resting location.

As used herein, the resting location for the slide corresponds to an absolute dimension of the slide travel path. Alternately, the resting location may be considered to refer to a terminal or end position at which the slide is placed. This absolute slide position, for example, may be defined in terms of an exact slide stroke position, such as an angular specification. One angular value expression of the resting location may be provided in the form of a degree measure (0–359°) relative to the top dead center (TDC) position of the press machine crankshaft.

The present invention provides the user with the ability to place the slide at a specific location along its travel path. This feature distinguishes over other systems that permit the operator only to specify a region or zone in which the slide can come to rest. The increase in positional precision afforded by the invention enhances the ability of the user to perform various press-related tasks that require positioning of the slide at exact discrete stroke positions.

Additionally, the invention distinguishes over systems where the user is afforded only the opportunity to indicate the point at which to commence the stopping operation (e.g., disengage clutch and activate brake), not the stroke position at which the slide actually comes to rest, as in the invention. For this purpose, the invention utilizes an algorithm that determines the advance position at which to commence the stopping operation so that the slide subsequently will come to rest at the specified resting location.

Figure 2:
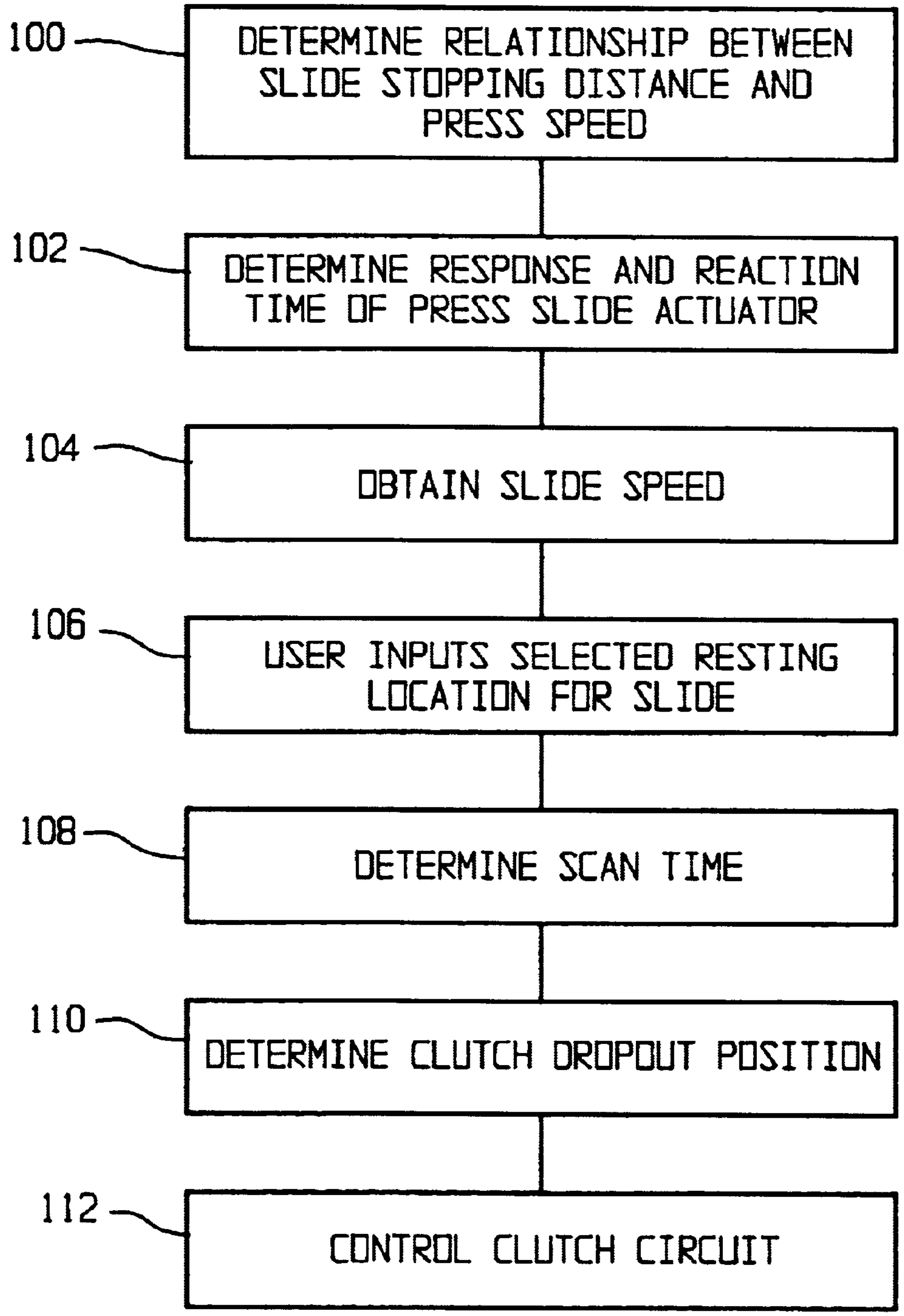
FIG. 2 is a flowchart describing one illustrative operating sequence of the invention.

Referring now to FIG. 2, there is shown a flowchart depicting one illustrative procedure for selectively positioning a press machine slide, according to one example of the present invention.

Generally, in one form, the present invention executes various computational tasks to compute and control the dropout position necessary to place the slide at the resting location specified by the user. This process involves, in part, a determination of the end-to-end time that it takes for the system to receive the user selection, process the information, generate the appropriate command signals, and actuate the stopping mechanism. Each stage of the process involves a time factor that must be taken into account to determine the precise position at which the stopping activity should actually commence. It is an object of the invention to provide a system having as near an instantaneous response as possible between the moment of user selection and the actual physical disengagement of the clutch.

According to one form of the invention, the determination of clutch dropout position utilizes a first parameter value and a second parameter value that are input into the processor during the initial setup of the mechanical press 10, for example. Because the first value and second value remain substantially constant during the operational life of mechanical press 10, these values will only need to be received once and can be used to determine dropout positions for any specified stroke position. As discussed further, the determination of clutch dropout position employs these two predetermined values and the press speed.

The first value represents the reaction time of the flywheel/clutch/brake assembly 36. According to the invention, the first value is the composite time that it takes for a relay to remove electrical power from a clutch valve (not shown), the time it takes the clutch valve to respond to that signal, and the time it takes for the flywheel /clutch/ brake assembly 36 to move an actuating device from a clutch position to a brake position.

The second value represents the amount of advancement necessary per each unit of strokes per minute of the press speed. In particular, the second value defines the amount of advance angular margin or offset needed at which to commence the stopping operation so that the slide will come to rest at a known angular displacement from the advance stopping point. The second value may also be considered to describe the functional relationship between slide stopping distance (as measured in angular coordinates) and press speed. This advancement is defined as a function of press speed (e.g., strokes per minute), since stopping distance varies with press speed.

The second value can be determined by repeatedly running the press at top speed, signaling to stop the press, and adjusting the second value, until the press stops at the desired position. Once this value is determined, it is consistent throughout press operation for any press speed. When determining the clutch dropout position, the second value serves to account for variations in stopping distance as a function of press speed. Accordingly, the second value facilitates a speed compensation function.

Once the first and second values are known, the processor need only receive the value of press speed, and employ the three values in a speed compensation algorithm for determining the dropout position of the clutch valve.

Referring more specifically to FIG. 2, the slide control procedure involves determining the first parameter value pertaining to the responsivity of the slide actuator (i.e., flywheel, crankshaft, and clutch-brake combination) and the second parameter value pertaining to the functional relationship between advance angular offset and press speed. (Steps 100, 102).

A measure of the press slide speed is then obtained by any suitable means known to those skilled in the art. (Step 104). The user selection of slide resting location is also furnished.

(Step 106).

In one form, the press slide speed is obtained from a conventional encoder or resolver unit that provides an indication of press speed and/or press position. As known to those skilled in the art, press position can be calculated from press speed and information describing the starting position of the press. For example, a device implementing an integration function can provided a position function based upon a speed function.

The retrieval of speed information typically occurs pursuant to a polling process by which the polling unit (e.g., processor) prompts the polled device (e.g., speed resolver) at defined intervals of time represented by a scan time value. According to the invention, the slide control process takes into account the scan time. (Step 108).

According to one illustrative form of the speed compensation algorithm of the invention used to compute clutch dropout position, the speed value is converted into appropriate units and multiplied by the second parameter value (i.e., speed-dependent angular advancement), and the product is then added to the first parameter value. This calculation provides a representation of the total stop time that accounts for speed-compensation and press reaction time. This stop time is then added to the processor scan time value and the sum is converted into degrees in a conventional manner.

This final calculated degree measure represents the angular offset relative to the specified resting location at which the stopping activity should commence, namely, when actual disengagement of the clutch and engagement of the brake occurs. Once this angular offset value is determined in degrees, it is subtracted from the user specified resting location (represented in an absolute degree position) to produce an actual absolute stroke position degree value corresponding to the dropout position of the clutch valves. (Step 110).

The slide position is then monitored to detect the appropriate stroke position to initiate the clutch dropout process. At the appropriate moment, the clutch valve is commanded to toggle to a clutch dropout state. (Step 112).

According to other features of the invention, the determination of clutch dropout position (namely, the stroke position at which the clutch disengages) can take into account various other input variables in addition to the first and second parameter values and press speed. For example, the slide control process could incorporate information on any data that may contribute to or otherwise affect an accurate calculation of the clutch dropout position.

Examples of such data could include, but are not limited to, press machine type, counter-balance setting and/or position, and die characteristics. This data generally represents information that is input to the processor and typically is associated with the particular press machine application or configuration.

Other data may include monitored characteristics that are susceptible to variation and relate, for example, to the computational environment, such as delay-related factors and computational or communication times. The monitored characteristics are preferably continuously collected and evaluated in order to adjust the clutch dropout accordingly so that the slide stop position is more accurately computed.

Figure 3:
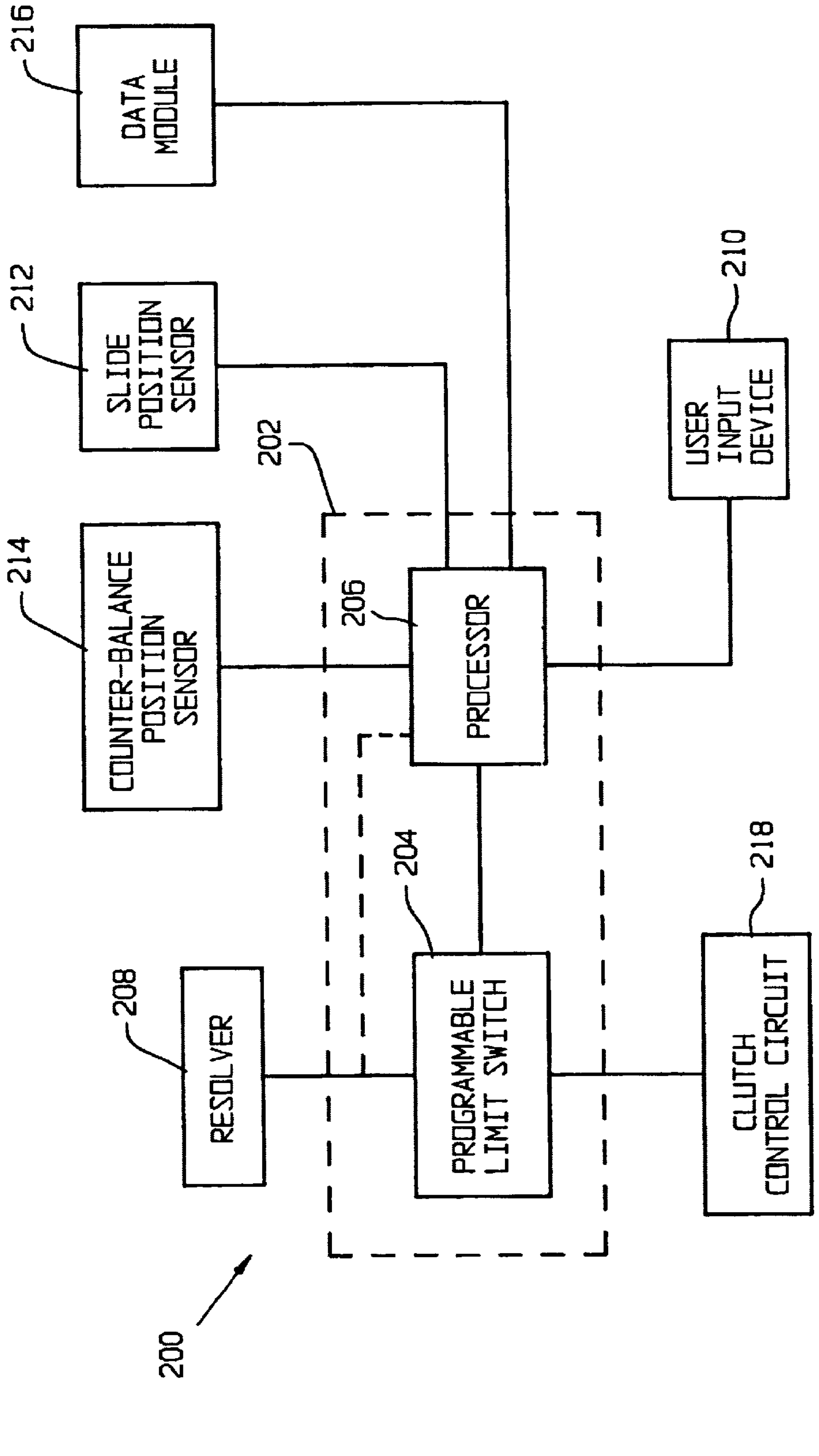
FIG. 3 is a block diagram schematic representation of one form of the invention.

Referring now to FIG. 3, there is shown a block diagram schematic view of a control system 200 for selectively controlling the position of a press machine slide, according to another example of the present invention.

The illustrated control system 200 includes a programmable limit switch module 202 including a programmable limit switch 204 and processor 206. Module 202 is connected to a conventional resolver or encoder unit 208 configured to provide a measure of press slide speed. Resolver 208 may be provided in any conventional form, such as a slide speed detector, sensor, or transducer. In known manner, speed resolver 208 may constitute a component part of module 202.

Processor 206 is configured to implement and perform the algorithm depicted illustratively in FIG. 2. Processor 206 may be implemented in any suitable form, such as a programmable logic controller, special purpose microprocessor, and general purpose computer programmed to perform the indicated algorithm.

A user input device 210 is provided to enable the user to furnish an indication of a selective resting location for the press slide. Any suitable input mechanism may be used. For example, a graphical user interface with a touchscreen capability may be used. Also, a manual entry device such as a simple alphanumeric keypad may be used. As shown, the user selection is forwarded to processor 206.

Processor 206 is also communicatively connected to a sensor assembly comprising slide position sensor 212 and counter-balance position sensor 214. The slide position sensor 212 and counter balance position sensor 214 may be provided in any suitable form, such as transducers of the type commonly utilized to monitor speed and position parameters. A setting for the counter-balance assembly may also be furnished from a storage device.

A data module 216 is also provided to communicate a plurality of input values to processor 206. These input values may include, for example, a value of machine type, a value of counter-balance setting, and values of die characteristics. For this purpose, data module 216 may take any suitable form, such as a manually actuatable input mechanism Additionally, RF tag or bar code readers may be utilized if RF or bar tag identifiers are utilized to store any of the plurality of input values. For example, RF tags or other communication devices, such as bar codes may be utilized to store information relating to die characteristics. This form of communication of die characteristics is taught by pending U.S. patent application Ser. No. 09/062,210, the disclosure of which is explicitly incorporated herein by reference thereto.

The programmable limit switch 204 is provided in a conventional form and is configured in a known manner to programmably establish an input-output state relationship. For purposes of the invention, one of the output states is dedicated to the control of conventional clutch control circuit 218. Circuit 218 controls the clutch valves that actuate the operating states of the clutch assembly, namely, clutch engagement and disengagement.

During operation, in relation to a press running cycle, the clutch normally engages the main flywheel of the press to transmit the rotary motion of the flywheel to crankshaft 38. This rotary motion is then translated into reciprocating motion of slide 20. If the press operator desires to stop the press at a specified resting location, such as during tooling or feed roll setup, the user enters the selected resting location via user input device 210.

Upon receiving a stop request in the form of a slide position selection communicated from user input device 210, processor 206 executes a clutch dropout determination algorithm, such as the one depicted in FIG. 2. In particular, processor 206 collects information from counter-balance sensor 214, slide position sensor 212, and data module 216. Processor 206 also polls resolver 208 and/or programmable limit switch 204 to receive a measure of slide speed.

Processor 206 then determines clutch dropout position based upon the information indicated above, in accordance with the algorithmic procedure outlined above in connection with FIG. 2. The clutch dropout position, in one form, may be expressed as an angular dimension pertaining to the slide travel cycle. Processor 206 programs the relevant clutch-related input-output state relationship in programmable limit switch 204 with the clutch dropout position determination.

The programmable limit switch 204 continues to receive information regarding the slide position (via resolver 208 or slide position sensor 212, for example) and switches the clutch-related output state once the slide position is detected that corresponds to the clutch dropout position. The toggling action of the output state asserts a discrete output signal to clutch control circuit 218 that commands circuit 218 to effectuate a dropout or disengage mode for the clutch assembly.

The entire process from user selection of the resting location to signaling of clutch control circuit 218 by programmable limit switch 204 preferably occurs automatically without any human or manual intervention, except for input of the requested slide position.

According to one feature of system 200, management of the control process is preferably fully centralized within stand-alone programmable limit switch module 202. As a stand-alone unit, module 202 is capable of controlling the entire slide position procedure without the need for any remote communication or processing tasks. In particular, all of the data processing and control, command, and communication tasks are fully integrated within module 202.

By comparison, for example, in a distributed environment where the processing functions performed by dedicated processor 206 are instead executed by a main control processor connected to the programmable limit switch over a backplane communications bus, significant scan times on the order of 20 milliseconds are required by the main processor to retrieve speed data. This scan time is primarily attributable to the download cycle associated with data transfers and polling activity carried out over a backplane communications bus.

However, according to the invention, module 202 is configured with a processor 206 having a scan time on the order of 2 microseconds relative to the polling of resolver 208 and/or programmable limit switch 204. Since all of the required processing is performed on-board by processor 206 and the necessary slide speed data is acquired locally (i.e., there is no communication bus connecting processor 206 and limit switch 204), there is no need to communicate over a backplane connection or other such communication bus.

For example, the connections between processor 206 and resolver 208 and/or programmable limit switch 204 can be hard-wired. In particular, direct physical connections can be provided between processor 206 and resolver 208 and/or programmable limit switch 204. In terms of scan time, this direct connectivity compares favorably to distributed environments having backplane communication architectures, where the main control processor retrieves speed data from the programmable limit switch over a relatively slower virtual or logical connection.

This reduction in scan time enables system 200 to provide a more instantaneous response to the reception of a slide positioning request entered via user input device 210. Accordingly, the selected resting position of the slide is achieved more rapidly than other systems having longer scan times.

Any suitable means known to those skilled in the art can be used to provide module 202 in a self-contained, fully functional, modular integrated unit. According to one aspect, module 202 may be configured to have a plug-and-play capability that enables it to be installed and operated as a black-box arrangement, requiring no connections to or configuration with external communication buses, computers or controllers (except a connection to resolver 208 if not otherwise incorporated into module 202). The connections to the various sensors and data module can readily be made without further reconfiguration of module 202. Such integration is well known to those skilled in the art.

It is also seen that module 202 has an independent, embedded, built-in processing capability provided in the form of processor 206. For this purpose, processor 206 will include or otherwise have access to the necessary clutch dropout position algorithm. For example, the algorithm can be supplied as executable software via an updatable local storage device (e.g., RAM or EEPROM) in module 206, or as firmware implemented in logic circuitry (i.e., a programmable logic controller).

As an additional enhancement to system 200, a slide inching mechanism may be provided for use with the present invention to provide additional small-scale incremental adjustments to slide position, if needed. However, the exact slide positioning afforded by the invention typically will obviate the need for any further slide positioning, such as would be required if the slide is only stopped within a slide stop zone. Such a slide inching mechanism is disclosed in U.S. Pat. No. 5,603,237, the disclosure of which is explicitly incorporated herein by reference thereto.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system in association with a press machine environment having a slide and a slide movement apparatus to selectably control movement of said slide, said system comprising:

an input device, said input device being configured to enable a user to selectively indicate a resting location for said slide corresponding to a chosen absolute slide resting position; and a control unit operatively associated with said slide movement apparatus, said control unit being configured to control operation of said slide movement apparatus using the resting location indication operatively received from said input device.

2. The system as recited in claim 1, wherein said input device comprises:

a graphical user interface.

3. The system as recited in claim 1, wherein said control unit comprises:

a processor.

4. The system as recited in claim 3, wherein said processor being configured to operatively generate at least one apparatus control signal as a function of press machine type, counter-balance setting and/or position, slide position, slide speed, die characteristics, delay-related factors, computational time and/or processing time, scan time, or any combination thereof.

5. The system as recited in claim 4, wherein said slide movement apparatus comprises:

a brake-clutch combination; and a clutch control circuit.

6. The system as recited in claim 5, wherein the at least one apparatus control signal operatively generated by said processor includes a signal specifying clutch dropout and/or brake activation.

7. The system as recited in claim 3, wherein said processor being configured to operatively generate at least one signal specifying press machine clutch dropout and/or press machine brake activation.

8. The system as recited in claim 3, wherein said processor being configured to determine a press machine clutch dropout condition based at least in part upon press machine type, counter-balance setting and/or position, slide position, slide speed, die characteristics, delay-related factors, computational time and/or processing time, scan time, or any combination thereof.

9. The system as recited in claim 1, wherein said control unit comprises:

a programmable limit switch module.

10. The system as recited in claim 9, wherein said programmable limit switch module comprises:

a programmable limit switch device, said programmable limit switch device being operatively connected to a press machine clutch control circuit; and a processor, said processor being operatively connected to said programmable limit switch device, said processor being configured to determine a clutch dropout value based at least in part upon the resting location indication operatively received from said input device and input data comprising a measure of slide speed.

11. The system as recited in claim 10, further comprises:

a resolver to provide a measure of slide speed and/or slide position.

12. The system as recited in claim 11, further comprises:

a non-bus connection between said processor and at least one of said resolver and said programmable limit switch device.

13. The system as recited in claim 1, wherein the slide resting location indication is representative of a specific angular value.

14. A system in association with a press machine environment having a slide and a slide movement apparatus to selectably control movement of said slide, said system comprising:

a first means to provide an indication of a resting location for said slide corresponding to a chosen absolute slide resting position; and a second means to selectably position said slide in accordance with a resting location indication operatively provided by said first means.

15. The system as recited in claim 14, wherein said first means comprises:

a user-interactive selector.

16. The system as recited in claim 14, wherein said first means comprises:

a graphical user interface.

17. The system as recited in claim 14, wherein said second means comprises:

a slide movement apparatus to control movement of said slide; and a processor configured to control operation of said slide movement apparatus, using the resting location indication operatively provided by said first means.

18. The system as recited in claim 17, wherein said processor being configured to operatively generate at least one apparatus control signal as a function of press machine type, counter-balance setting and/or position, slide position, slide speed, die characteristics, delay-related factors, computational time and/or processing time, scan time, or any combination thereof.

19. The system as recited in claim 18, wherein said slide movement apparatus comprises:

a brake-clutch combination; and a clutch control circuit.

20. The system as recited in claim 19, wherein the at least one apparatus control signal operatively generated by said processor includes a signal specifying clutch dropout and/or brake activation.

21. The system as recited in claim 17, wherein said processor being configured to determine a press machine clutch dropout condition based at least in part upon press machine type, counter-balance setting and/or position, slide position, slide speed, die characteristics, delay-related factors, computational time and/or processing time, scan time, or any combination thereof.

22. The system as recited in claim 14, wherein said second means comprises:

a programmable limit switch, said programmable limit switch being operatively connected to a press machine clutch control circuit; and a processor, said processor being operatively connected to said programmable limit switch, said processor being configured to determine a clutch dropout value based at least in part upon the resting location indication operatively provided by said first means and input data comprising a measure of slide speed.

23. The system as recited in claim 22, further comprises:

a resolver to provide a measure of slide speed and/or slide position.

24. The system as recited in claim 23, further comprises:

a non-bus connection between said processor and at least one of said resolver and said programmable limit switch.

25. The system as recited in claim 14, wherein the slide resting location indication being representative of a specific angular value.

26. An apparatus in association with a press machine environment having a slide and a slide controller configured to control movement of said slide, said apparatus comprising:

a programmable limit switch, said programmable limit switch being operatively connected to said slide controller; and a processor, said processor being operatively connected to said programmable limit switch, said processor being configured to define a slide stoppage event based at least in part upon an indication of a resting location for said slide corresponding to a chosen absolute slide resting position.

27. The apparatus as recited in claim 26, further comprises:

an input device enabling a user to selectably generate the resting location indication.

28. The apparatus as recited in claim 26, wherein said slide controller includes a press machine clutch control circuit.

29. The apparatus as recited in claim 28, wherein said processor being configured to determine a clutch dropout condition based at least in part upon press machine type, counter-balance setting and/or position, slide position, slide speed, die characteristics, delay-related factors, computational time and/or processing time, scan time, or any combination thereof.

30. The apparatus as recited in claim 26, further comprises:

a resolver to provide a measure of slide speed and/or slide position.

31. The apparatus as recited in claim 30, further comprises:

a non-bus connection between said processor and at least one of said resolver and said programmable limit switch.

32. The apparatus as recited in claim 26, wherein the slide resting location indication being representative of a specific angular value.

33. A method in association with a press machine environment having a slide, said method comprising the steps of:

providing an indication of a resting location for said slide corresponding to a chosen absolute slide resting position; and controlling movement of said slide in accordance with the resting location indication.

34. The method as recited in claim 33, wherein said slide movement control step further comprises the steps of:

determining a clutch dropout condition for a press machine clutch, using the resting location indication; and controlling operation of the press machine clutch in accordance with the clutch dropout condition.

35. The method as recited in claim 34, wherein the determination of clutch dropout condition being based at least in part upon press machine type, counter-balance setting and/or position, slide position, slide speed, die characteristics, delay-related factors, computational time and/or processing time, scan time, or any combination thereof.

36. The method as recited in claim 34, wherein the step of determining the clutch dropout condition further comprises the steps of:

providing a processor; and communicating slide speed and/or slide position to said processor over a non-bus connection.

37. The method as recited in claim 33, wherein the slide resting location indication being representative of a specific angular value.

38. A method in association with a press machine environment having a slide, said method comprising the steps of:

providing an indication of a resting location for said slide corresponding to a chosen absolute slide resting position; and causing said slide to come to rest substantially at the chosen absolute slide resting position.

39. The method as recited in claim 38, wherein the step of causing said slide to come to rest further comprises the steps of:

selectively disengaging a press machine clutch and/or selectively engaging a press machine brake.

40. The method as recited in claim 38, wherein the step of causing said slide to come to rest further comprises the steps of:

determining a clutch dropout condition for a press machine clutch, using the resting location indication; and controlling operation of the press machine clutch in accordance with the clutch dropout condition.

41. The method as recited in claim 40, wherein the determination of clutch dropout condition being based at least in part upon press machine type, counter-balance setting and/or position, slide position, slide speed, die characteristics, delay-related factors, computational time and/or processing time, scan time, or any combination thereof.

42. The method as recited in claim 38, wherein the slide resting location indication being representative of a specific angular value.

* * * * *